No. 736,012. PATENTED AUG. 11, 1903.
A. G. POWERS.
VENT CONTROLLER.
APPLICATION FILED DEC. 22, 1902.
NO MODEL.
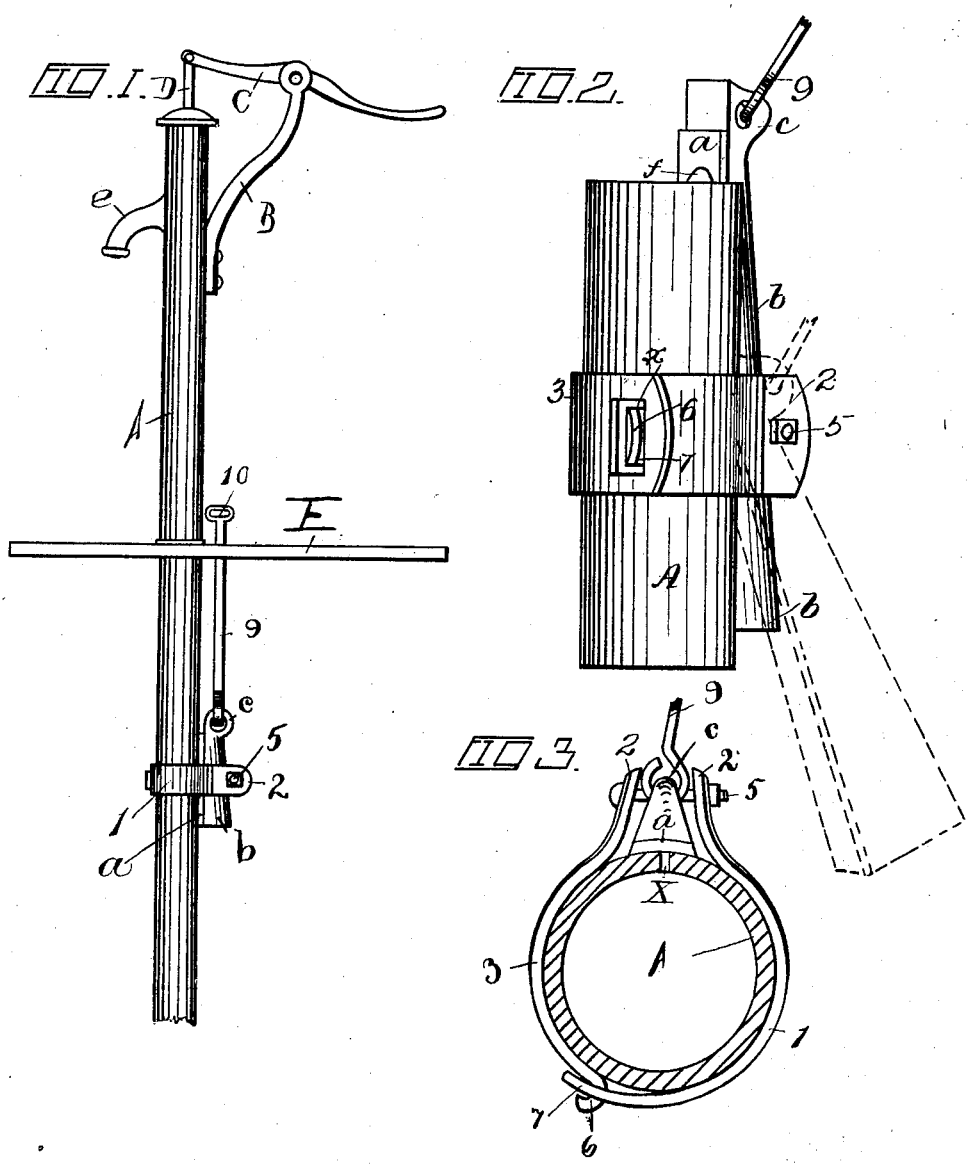

No. 736,012.

Patented August 11, 1903.

UNITED STATES PATENT OFFICE.

ALONZO G. POWERS, OF ST. JAMES, NEBRASKA.

VENT-CONTROLLER.

SPECIFICATION forming part of Letters Patent No. 736,012, dated August 11, 1903.

Application filed December 22, 1902. Serial No. 136,191. (No model.)

*To all whom it may concern:*

Be it known that I, ALONZO G. POWERS, residing at St. James, in the county of Cedar and State of Nebraska, have invented certain useful Improvements in Vent-Controllers; and I do hereby declare that the following is a full, clear, and exact description of the invention, such as will enable others skilled in the art to which it appertains to make and use the same, reference being had to the accompanying drawings, which form a part of this specification.

This invention relates to a novel attachment to be used in connection with pumps to prevent water freezing in the upper end of the pump.

In the accompanying drawings I have shown in Figure 1 an illustration of an ordinary pump provided with my attachment. Fig. 2 discloses an enlarged detail showing the vent-closer in open position in dotted lines, while Fig. 3 shows a top view disclosing the arrangement of the clamping-collars as used in my invention.

The water within the upper end of pumps as generally constructed is likely to freeze in cold weather, causing a cracking of the pump-tube. In order to prevent this, I provide the pump-tube A at a suitable point with a vent-opening, as X, as shown in Fig. 3, which opening is placed a suitable distance below the earth-line or pump-platform E, as shown in Fig. 1.

In the accompanying drawings the pump-tube A is provided with the bracket B, with operating-handle C, which is suitably secured to the pump-plunger D, the pump having the spout $e$. Secured to the pump-tube A is a two-part collar comprising the members 1 and 3, the member 1 being provided at its end 7 with an opening $x$, as shown in Fig. 2, while the member 3 is provided with a hook 6, extending through the opening $x$, as shown in Figs. 2 and 3. The ends of these members 1 and 3 are bent outward to form the ears 2 2, adapted to receive the nut-provided bolt 5, by means of which these two collar members are securely clamped to the pump-tube A. The bolt 5 is placed in alinement with the vent-opening X, as shown.

Held between the pump-tube A and the bolt 5 is a wedge-shaped plug $b$. The plug above is provided with a perforated ear $c$, adapted to receive the lower hook end of the operating-bar 9, provided above with the handle 10, as disclosed in Fig. 1. Upon one side this wedge-shaped plug is provided with the packing-strip $a$, secured by suitable rivets $f$, one being partly shown in Fig. 2. In winter when the weather is below a freezing temperature the operating-bar 9 would be pushed downward, so that the wedge-shaped plug $b$ would rest upon its ear $c$, being held by the bolt 5, and so permitting the water above the vent-opening X to drain out of the pump-tube. During non-freezing weather the operating-bar 9 is pulled upward, so that the plug $b$ is impinged between the tube A and bolt 5, as shown in Fig. 1, the packing-strip $a$ then preventing leakage.

Having thus described my said invention, what I claim as new, and desire to secure by Letters Patent, is—

The combination with a collar member provided with a perforated ear and a slot, of a second collar member provided with a hook and a perforated ear, said hook working into aforesaid opening, a nut-provided bolt secured within the perforations of said ears, a wedge-shaped vent-closing plug, provided with an ear above adapted to form a stop and rest upon aforesaid bolt, a packing-strip secured to the inner surface of said vent-closing plug, and an operating-bar secured to said plug all arranged substantially as and for the purpose set forth.

In testimony whereof I affix my signature in presence of two witnesses.

ALONZO G. POWERS.

Witnesses:
FREDERICK J. LARSON,
WILLIAM E. WINDSOR.